US006108326A

United States Patent [19]

Bruwer

[11] Patent Number: 6,108,326

[45] **Date of Patent: *Aug. 22, 2000**

[54] MICROCHIPS AND REMOTE CONTROL DEVICES COMPRISING SAME

[75] Inventor: Frederick Bruwer, Chandler, Ariz.

[73] Assignee: Microchip Technology Incorporated, Chandler, Ariz.

[ * ] Notice: This patent is subject to a terminal disclaimer.

[21] Appl. No.: 08/853,328

[22] Filed: May 8, 1997

[51] Int. Cl.[7] .................................................... H04Q 1/00

[52] U.S. Cl. .................................... 370/342; 340/825.31

[58] Field of Search ..................... 370/342; 340/825.31, 340/825.34, 825.56, 825.69, 825.72; 342/42

[56] References Cited

U.S. PATENT DOCUMENTS

| | | | |
|---|---|---|---|
| Re. 29,525 | 1/1978 | Willmott . | |
| 4,380,762 | 4/1983 | Capasso . | |
| 4,385,296 | 5/1983 | Tsubaki et al. . | |
| 4,426,637 | 1/1984 | Apple et al. . | |
| 4,529,980 | 7/1985 | Liotine et al. . | |
| 4,535,333 | 8/1985 | Twardowski . | |
| 4,574,247 | 3/1986 | Jacob . | |
| 4,590,470 | 5/1986 | Koenig . | |
| 4,596,985 | 6/1986 | Bongard et al. . | |
| 4,638,433 | 1/1987 | Schindler . | |
| 4,652,860 | 3/1987 | Weisshaupt et al. . | |
| 4,686,529 | 8/1987 | Kleefeldt . | |
| 4,710,613 | 12/1987 | Shigenaga . | |
| 4,723,121 | 2/1988 | van den Boom et al. . | |
| 4,737,770 | 4/1988 | Brunius et al. . | |
| 4,750,118 | 6/1988 | Heitschel et al. . | |
| 4,754,255 | 6/1988 | Sanders et al. . | |
| 4,779,090 | 10/1988 | Micznik et al. . | |
| 4,829,296 | 5/1989 | Clark ................................. | 340/825.31 |
| 4,835,407 | 5/1989 | Kataoka et al. . | |
| 4,847,614 | 7/1989 | Keller . | |
| 4,855,713 | 8/1989 | Brunius . | |
| 4,878,052 | 10/1989 | Schullze . | |
| 4,885,788 | 12/1989 | Takaragi et al. . | |
| 4,890,108 | 12/1989 | Ze'Ev Drori et al. . | |
| 4,912,463 | 3/1990 | Li . | |
| 4,928,098 | 5/1990 | Dannhaeuser . | |
| 4,931,789 | 6/1990 | Pinnow . | |
| 5,001,332 | 3/1991 | Shrenk . | |
| 5,049,867 | 9/1991 | Stouffer . | |
| 5,055,701 | 10/1991 | Takeuchi . | |
| 5,103,221 | 4/1992 | Memmola . | |
| 5,107,258 | 4/1992 | Soum ................................ | 340/825.31 |
| 5,144,667 | 9/1992 | Pogue, Jr. et al. . | |
| 5,224,163 | 6/1993 | Gasser et al. . | |

FOREIGN PATENT DOCUMENTS

| | | | |
|---|---|---|---|
| 0 155 378 A1 | 7/1988 | European Pat. Off. . | |
| 0 155 378 B1 | 7/1988 | European Pat. Off. . | |
| 0 154 019 A1 | 8/1988 | European Pat. Off. . | |
| 0 154 019 B1 | 8/1988 | European Pat. Off. . | |
| 0 311 112 A2 | 4/1989 | European Pat. Off. . | |
| 88116675 | 4/1989 | European Pat. Off. .......... | 340/825.31 |
| 0 459 781 | 12/1991 | European Pat. Off. . | |

(List continued on next page.)

*Primary Examiner*—Brian Zimmerman
*Attorney, Agent, or Firm*—Ari O. Pramudji; Frohwitter

[57] ABSTRACT

Encoder and decoder microchips suitable for use in remote control devices. The encoder microchip performs an encoding function on an identification number embedded in the said microchip and a combination of a unit number and a stepping counter value, so as to generate a transmission value which is only decodable by a related decoding function having access to the same identification number. The decoder microchip decodes the transmission value into a decoded unit number and a decoded counter value and means for comparing the decoded counter value with a decoder counter value range. The encoder and decoder microchips are provided with means for changing, e.g. in a preferred mode incrementing, the counter values by a number greater than one after a period of time, subsequent to the encoder microchip being activated or the decoder microchip receiving a transmission value. The encoder and decoder microchips are also provided with means for synchronizing the decoder microchip with a particular encoder microchip which has generated a synchronization command.

12 Claims, 7 Drawing Sheets

FOREIGN PATENT DOCUMENTS

| | | |
|---|---|---|
| 0 605 996 | 7/1994 | European Pat. Off. . |
| 0 335 912 B1 | 3/1995 | European Pat. Off. . |
| 0 688 929 | 12/1995 | European Pat. Off. . |
| 2 606 232 | 5/1988 | France . |
| 2 607 544 | 6/1988 | France . |
| 2 685 520 | 6/1993 | France . |
| 33 207 21 A1 | 12/1984 | Germany . |
| 32 34 538 A1 | 3/1987 | Germany . |
| 35 32 156 A1 | 3/1987 | Germany . |
| 2 131 992 | 6/1984 | United Kingdom . |
| 2 133 073 | 7/1984 | United Kingdom . |
| 2 295 911 | 6/1996 | United Kingdom . |
| WO 93/20538 | 10/1993 | WIPO . |
| WO 94/11829 | 5/1994 | WIPO . |

| | | | |
|---|---|---|---|
| CSR3 | CSR2 | CSR1 | CSR0 |

| |
|---|
| CSR3 |

| | | | | | | | |
|---|---|---|---|---|---|---|---|
| PB | TP | 0 | 0 | 0 | 0 | TX1 | TX0 |

PB
0 PUSH BUTTON 1
1 PUSH BUTTON 2

TP
0 VOLATILE COUNTER
1 NON VOLATILE COUNTER

TX1 TX0
0 0 TRANSMITTER 0
0 1 TRANSMITTER 1
1 0 TRANSMITTER 2
1 1 TRANSMITTER 3

| | |
|---|---|
| CSR2 | MODE |

AAH NORMAL CODE
A5H PANIC CODE
55H SYNC CODE
XXH UTILITY CODE

| | | |
|---|---|---|
| CSR1 | CSR0 | = COUNTER VALUE |

Fig. 5

MICROCHIPS AND REMOTE CONTROL DEVICES COMPRISING SAME

FIELD OF THE INVENTION

This invention relates to security systems. More particularly, the invention relates to microchips suitable for use in remote control devices, to remote control devices comprising the said microchips and to a security system.

BACKGROUND OF THE INVENTION

Remote control via radio frequency or infra red media is well known and very popular for the control of car alarms, building alarms and automatic garage door equipment. Conventional remote control systems which are based on a uni-directional transmission with limited security features, are in common use and are available at relatively low prices. More sophisticated devices based on bi-directional transmission systems and extensive handshaking, are also available on the market and are known to the applicant. However, because of their high cost and certain practical disadvantages, they are not widely used in commercial remote control devices. The aforementioned conventional devices based on uni-directional transmission systems have two important shortcomings in the context of a security application, namely firstly—the codes they are able to transmit are usually fixed and—secondly, the number of combinations of codes that they can transmit, is relatively small. Either of these shortcomings can lead to access being given to unauthorized persons. Such unauthorized access can be obtained by way of an exhaustive search, in which all the different combinations are tested to see if they are accepted, something which could be done in a matter of minutes if an appropriate apparatus is used. As an alternative, a recording could be made of a transmission and this could be retransmitted to gain access. As a result, such conventional uni-directional systems can be accessed without the use of authorized remote control or other security devices.

Improved security can be derived from the known principle of code stepping or code hopping. U.S. Pat. Nos. 4,835,407 and 4,847,614, German Patent No. 3,244,049 and German Patent Publications DE-OS-33 20 721, DE-OS-32 34 538, DE-OS-34 07 436 and DE-OS-34 07 469 describe this principle in more detail. South African Patent Specification No. 89/8225 also describes a code hopping remote control system which is similar to the one described in U.S. Pat. No. 4,847,614.

U.S. Pat. No. 4,847,614 describes the generation, by a transmitter, of a different code word after each previous transmitting operation. Such new code word is produced anew by linking, according to a given function, starting from a stored original code word and the previously transmitted code word. The receiver operates in exactly the same way and compares the new code word it generates, by the same method, with the code word received from the transmitter. If the two code words agree, the centrally controlled locking system of the vehicle in which the apparatus is installed, is activated. If there is non-agreement, additional code words, say "n" code words produced in sequence by the receiver, are compared. Thereafter, if non-agreement persists after the "n" code words, the receiver switches over to an increased security mode wherein two successive code words transmitted in sequence must be successfully compared before the central locking system of the vehicle is activated. This double comparison must take place within the next m code words generated at the receiver. If the transmitting device and the receiving device are out of step by more than m+n, another signal is used to indicate to the receiver that it must search through its entire set of code words in an attempt to synchronize.

An essential feature of this remote control apparatus is that the receiver merely compares the received code word with the code word generated by itself without decoding the received code word to its original elements. Thus, in the event of non-agreement, and this will occur very often if the system is widely used in RF-devices, because of accidental reception from other users, this apparatus changes to an increased security mode, which is user unfriendly. When it is in the high security mode, the receiver will force the user to operate his/her transmitter more than once.

A further essential feature of this remote control device is that the "window" of disagreement which is still acceptable to the apparatus, is applied to the received code word and the code word generated by the receiver. If the code words are not the same with the first attempt, the receiver generates a second code word which is then compared with the received code word. This process may have to be repeated as many times as the size of the "window" which has been built into the receiver algorithm. Depending on the electronics in which this process is carried out, the size of the "window" and also the extent of disagreement between the first received code word and the first code word generated by the receiver, the reaction time for this apparatus could vary from transmission to transmission, and could be lengthy. However, a serious problem in the operation of the system results when the situation occurs that the transmitter and receiver are out of step by more than n+m steps.

It is taught by the aforementioned patent that another signal is to be supplied to the receiver to indicate to it that a total search must be done to achieve synchronization. Because of the enormous number of possible code words ($>10^9$), it could take several minutes to succeed. This patent even suggests that the user opens the transmitter and removes its batteries to facilitate a short search.

Both of the above situations are user unfriendly. If this process is repeated often, it also presents a security risk. The battery removal suggestion further precludes the use of non-volatile memory elements (EEPROM) for the counter of the transmitter. The use of EEPROM in the transmitter would have offered several advantages such as the elimination of standby power requirements, a longer battery life, fewer synchronization actions required and a guaranteed forward stepping (higher security). If this system must be expanded to decode two or more transmitters it will have to step through 2 (or more)×n code words if an unauthorized code word is received.

In addition, the above-described systems are also vulnerable to a newly developed sophisticated "code grabber." The new code grabber intercepts a piece or portion of the code word being transmitted when an authentic transmitter, e.g. the transmitter of a standard one button garage door opener remote control, is activated and jams the remaining portion of the code word being transmitted. During the same transmission, the code grabber then jams the portion of the code word it has already "grabbed" or recorded and then intercepts and records the remaining portion of the code word previously jammed. The code grabber then completely jams the signal until the user releases the button on the authentic transmitter. As a result, the code grabber now has one full complete authentic code word and the receiver in the garage door opener has not received a signal transmission. The above process is repeated by the code grabber until the user releases the button a second time, at which time the code grabber has two valid code words and the garage door opener receiver has received nothing. After the user releases the button the second time, the code grabber transmits the first code word it has captured and the door closes. The user thinks that the first transmission was simply noise, i.e., not received, and drives away to work for instance. The code grabber now has a second valid code word that can be transmitted in the future to open the garage door.

OBJECTS AND SUMMARY OF THE INVENTION

It is an object of the present invention to provide encoder and decoder microchips for use in a remote control system of increased security, of which the user friendliness has not been unduly sacrificed, comprising a transmitter remote control device and a receiver remote control device, wherein the transmitter remote control device comprises the encoder microchip, the encoder microchip forming part of an electronic circuit adapted to transmit a coded transmission value decodable by the decoder microchip, and wherein the receiver remote control device comprises the decoder microchip, the decoder microchip forming part of an electronic circuit adapted to receive and to decode the coded transmission.

It is a further object of the invention to provide a security system in which synchronization of the transmitter and receiver remote control devices can be achieved by a simple yet reliable and secure manner.

According to one aspect of the present invention, there is provided an encoder microchip comprising: (1) means for performing a non-linear encoding function on an identification number embedded in said microchip and a combination of a unit number and a stepping counter value, so as to generate a transmission value which is only decodable by a related decoding function having access to the same identification number; and (2) means for generating, upon a synchronization command being given thereto, a counter value which is encodable together with the synchronization command, to generate a synchronization transmission value which will facilitate the synchronization of a related decoder microchip having the same identification number. The encoder microchip may further comprise means for changing, e.g. incrementing or decrementing the counter value by a number greater than one, after a given period of time subsequent to the encoder microchip being operated.

The encoding function may be described by the following equation:

$^{f}$encode (Identification number, (unit number, counter value))=transmission value.

The encoding and related decoding functions are, as stated above, non-linear functions. This type of function is often used in the field of cryptography and is usually chosen for its characteristics which prevent or at least inhibit the prediction of its next output even though the non-linear function as well as previous outputs thereof may be known, as long as the identification number (PIN) remains unknown.

The unit number may be at least a one bit value. Although it may extend into thousands of bits and even more, it will be appreciated that the longer the unit number, the greater the security it offers but more expensive the microchip becomes.

The counter value is also preferably of more than a one bit length and may also extend into thousands of bits and even more, which will as would be appreciated, increase the security. The longer the counter value, however, the higher the cost.

It has been found that a 16 bit unit number and a 16 bit counter value, when combined, give adequate security because they could each individually be combined in more than 65,000 different combinations and together they could be combined in more than 4000 million combinations. Similarly, the identification number is preferably of more than a one bit length and is preferably as long as 64 bits in which case more than $10^{19}$ different combinations are possible.

The transmission value is preferably at least 16 bits long. It will be appreciated that if it is of a length less than 16 bits, it will be less secure and consequently it will be easier to decode.

According to another aspect of the invention, there is provided a decoder microchip comprising: (1) means for performing a decoding function on a received transmission value and an identification number embedded in the decoder microchip, so as to generate from the transmission value, a decoded unit number and a decoded counter value; (2) means for comparing the decoded counter value with a decoder counter value range; and (3) means, upon a valid synchronization command having been decoded by the decoder microchip, for synchronizing the decoder counter value with the counter value of an encoder microchip which has generated the synchronization command.

According to a further aspect of the invention, there is provided a decoder microchip comprising: (1) means for performing a decoding function on a received transmission value and an identification number embedded in the decoder microchip, so as to generate from the transmission value, a decoded unit number and a decoded counter value; (2) means for comparing the decoded counter value with a decoder counter value range; (3) means for recognizing, in the decoded unit number, a synchronization command; and (4) means for storing the decoded counter value in the event of a valid transmission value having been received. The decoder microchip may comprise means for changing, e.g. according to a preferred embodiment incrementing or decrementing the stored decoded counter value by a number greater than one, after a period of time subsequent to the receipt of a valid transmission value. The decoder microchip may comprise means for performing a format scan on signals so as to identify and respond to valid transmission values.

The decoding function performed by the decoder microchip is preferably such as to ensure that the decoded unit number and the decoded counter value are the same as, respectively, the unit number and the counter value encoded by an encoder microchip having the same identification number as the decoder microchip.

The decoder microchip preferably also comprises distinguishing means for distinguishing between a decoded unit number for normal operation and a synchronization command.

The decoder counter value may conveniently not be accepted by the decoder microchip as a valid counter value unless it is greater than the previously received valid counter value but less than the previously received valid counter value plus a value n, the value n constituting the number of lost codes the encoder microchip would still accept. Alternatively, in the event that the decoded unit number comprises a valid synchronization command, the decoder microchip may be adapted to store the decoded counter value plus one as the decoder counter value for subsequent use.

The decoder microchip may, in addition, comprise means for comparing the counter value with a value obtained from a uni-directional synchronization process to which the decoder microchip may be subjected.

Also according to the invention, there is provided a combined encoder and decoder microchip comprising: (1) means for performing a non-linear encoding function on an identification number embedded in said microchip and a combination of a unit number and a stepping counter value, so as to generate a transmission value which is only decodable by a related decoding function having access to the same identification number; (2) means for generating, upon a synchronization command being given thereto, a counter value which is encodable together with the synchronization command, to generate a synchronization transmission value which will facilitate the synchronization of a related decoder microchip having the same identification number; (3) means for performing a decoding function on a received transmission value and an identification number embedded in the microchip, so as to generate from the transmission value, a decoded unit number and a decoded counter value; (4) means for comparing the decoded counter value with the decoded counter value range; and (5) means, upon a valid synchronization command having been decoded by the microchip, for synchronizing the decoder counter value with the counter value of an encoder microchip which has generated the synchronization command.

According to a further aspect of the invention, there is provided a transmitter remote control device comprising encoder means and transmission means adapted to transmit a transmission value receivable by a receiver remote control device capable of responding thereto, the encoder means comprising means for performing an encoding function on an identification number embedded in the encoder means and a combination of a unit number and a variable counter value so as to generate a transmission value incorporated in the transmission, the transmission value being decodable through a related decoding function performed by the receiver remote control device.

The encoder means may be adapted to generate a stepping counter value through a uni-directional synchronization process for the synchronization of the encoder means of the receiver remote control device.

Also according to the invention, there is provided a receiver remote control device comprising decoder means comprising means for performing a decoding function on a combination of a transmission value and an identification number, so as to generate a decoded unit number and a decoded counter value; and means for comparing the decoded counter value number with a counter value range.

The receiver remote control device is preferably provided with means for providing an output indicative of or in response to a valid transmission value it has received.

The receiver remote control device may further comprise means for comparing the decoded counter value with a decoded counter value obtained from a uni-directional synchronization process pre-performed on the receiver remote control device by a transmitter remote control device. The counter values of both the encoder means and the decoder means may be retained by batteries or alternatively, by memory means.

In a preferred embodiment of the invention, electronic remote control apparatus is provided comprising encoder means for generating, when activated, a multibit code word by performing a function on a personal identification number (PIN) and a combination of a unit number and a counter value. Preferably, the counter value is incremented every time the apparatus is activated.

The electronic remote control means preferably comprises transmitter means for generating a transmission comprising the multibit code word. Conveniently, the encoder means is further adapted to generate, upon activation of a synchronization process, a synchronization multibit code word, wherein the synchronization multibit code word is a function of a personal identification number embedded in the encoder means, and a combination of a synchronization command word and a new counter value. The encoder means may further comprise panic means adapted to generate a panic command. Additionally, the encoder means may comprise electrically erasable programmable memory means or read and write memory means with standby mode means in the said encoder means to store the last counter value.

In order to facilitate the programming of a multibit personal identification number (PIN) into the memory means, the apparatus may comprise program means.

As an additional safety feature, the encoder means may comprise verification means for verifying the personal identification number without being able to read it, and means for locking an interface with the personal identification number (PIN), in order to bar all further attempts to change or verify the personal identification number.

In another preferred embodiment of the invention there is provided electronic remote control apparatus comprising decoder means for decoding the multibit code word received from the transmitter means.

The decoder means may be adapted to apply a function on the multibit code word received from the receiver in such a manner as to yield the unit number and the counter value to which the encoding function has been applied.

Preferably the personal identification number (PIN) of the encoder means is the same as that of the decoder means, otherwise the unit number and the counter value window of the decoder means would most probably not compare with the unit number and counter value to which the encoder means has applied the function and the received code word would then be ignored.

The decoder means is preferably adapted to: (1) compare the decoded unit number of the transmitted code word with its pre-embedded unit number, and upon agreement, (2) check that the counter value falls inside a valid range of counter numbers, and if both conditions are satisfied, (3) give an indication thereof to the outside, in the form of a flag, and (4) store the received counter value if it was found to be valid.

The decoder means may further be adapted, if one of the conditions is not satisfied, to ignore the received multibit code word and to scan its input for another multibit code word.

Each of the encoder and decoder means may comprise means for programming, verifying and locking a personal identification number (PIN). In addition, the decoder means may comprise means for storing the latest valid received counter value.

Further according to the invention, the encoder means may comprise means for recognizing, within a sequence of counter values, a false counter value, and means responsive thereto for preventing desynchronization. The means for preventing desynchronization may be adapted to also give a battery low indication. Furthermore, the encoder means may comprise means for stepping the synchronization command word to prevent the same synchronization command word from being used illegitimately.

Also according to the invention, the decoder means may comprise means for recognizing a panic command generated in the encoder means, and means for responding thereto. In addition, the decoder means may comprise means for recognizing other commands and/or more than one unit number with independent counters, without having to perform the decoding process more than once.

BRIEF DESCRIPTION OF THE DRAWINGS

The invention will now be described, by way of a non-limiting example, with reference to the accompanying drawings in which:

FIG. 5 is a preferred format for the unit number and the counter value; and

DESCRIPTION OF PREFERRED EMBODIMENTS

Figure 1:
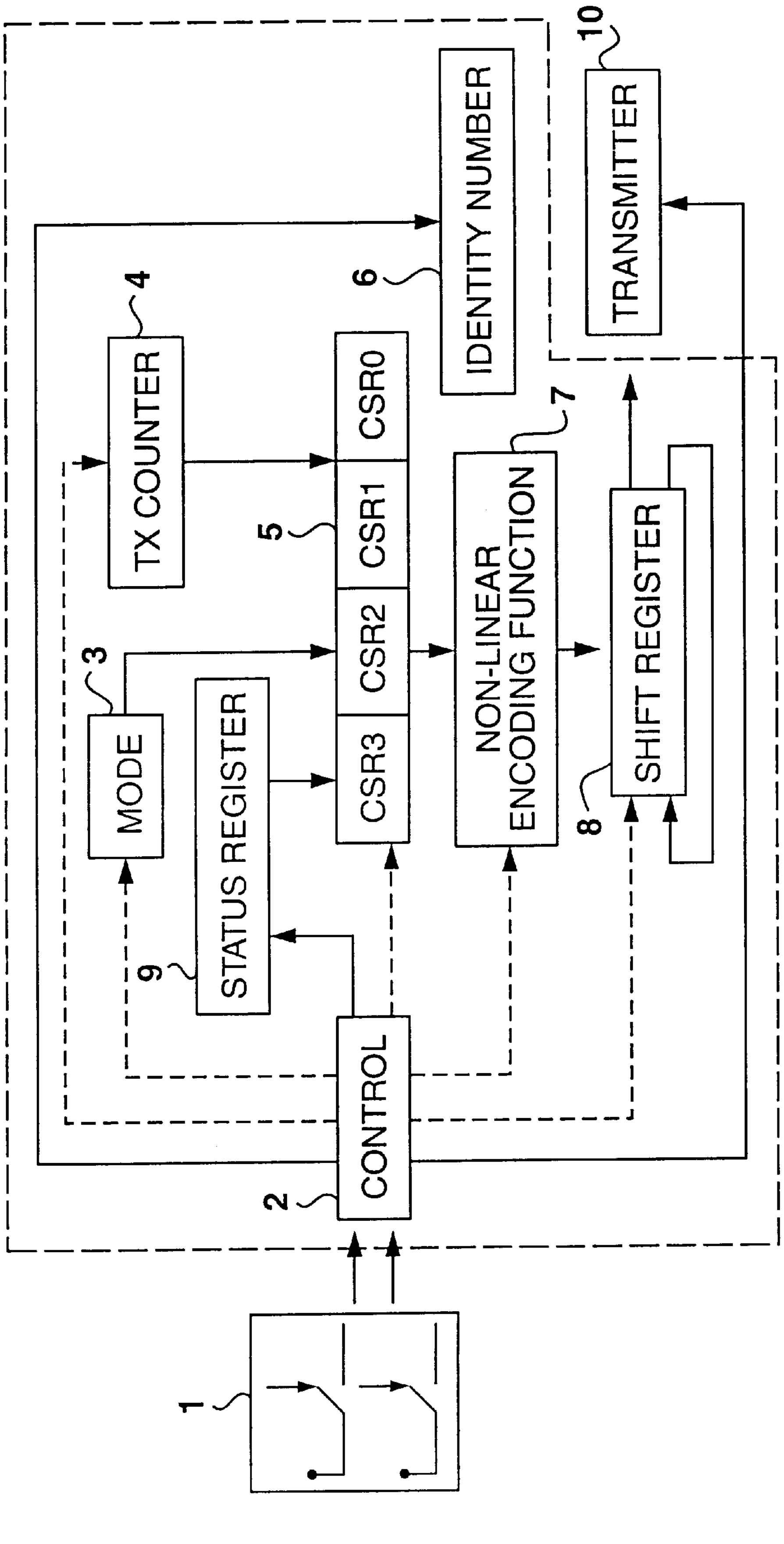
FIG. 1 is a block diagram of an encoder microchip in accordance with the invention.

Referring to FIG. 1, the encoder microchip receives an input from a pair of switches (1), and comprises a control unit (2), a mode unit (3), a transmit counter (4), an input register (5) for holding an input word, an ID register (6) for holding an identity number, logic means (7) for performing a non-linear function, a shift register (8) for holding an encoded value and repeatedly feeding the encoded value to a transmitter (10), and a status register (9) for holding the configuration of the encoder microchip. The status register (9), the identity number (6) and the transmitter counter (4) are all registers or memory elements that can be programmed into the microchip and may be non-volatile (EEPROM) or volatile (RAM) memory with battery backup. As will be appreciated by those skilled in the art, the functions of the encoder microchip can be implemented in dedicated logic although a microprocessor based implementation is also possible.

Figure 2:
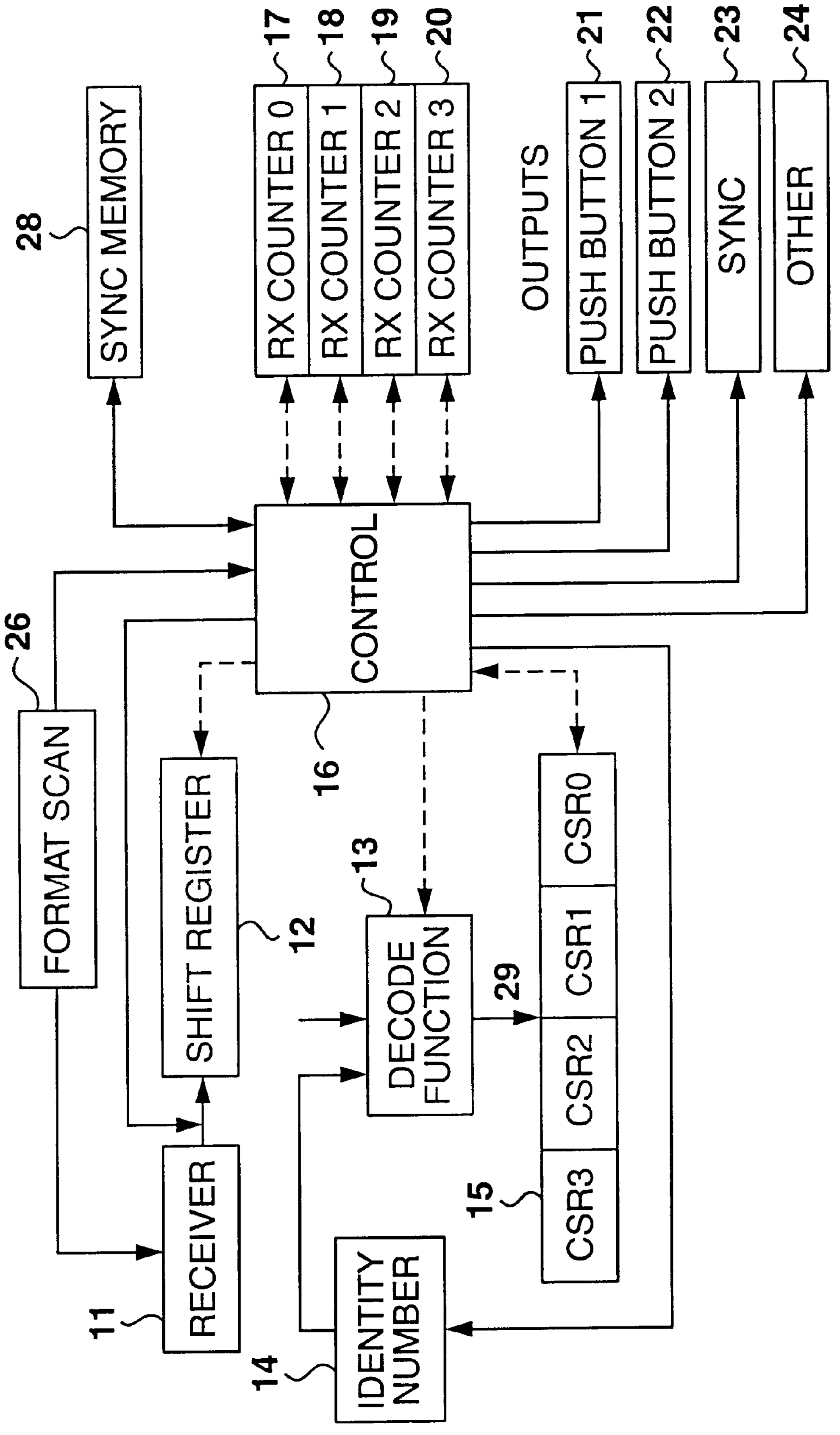
FIG. 2 is a block diagram of a decoder microchip in accordance with the invention.

Referring to FIG. 2, there is shown a receiver (11) for receiving a transmission value from the transmitter (10). The output of the receiver (11) is fed into a shift register (12). The value in the shift register (12) is decoded by decoding logic (13) using an identity number obtained from an ID register (14). The result obtained from the decoding logic (13) comprises a decoded unit number and a decoded counter value and is stored in a decoded result register (15). All the aforementioned steps are carried out under the control of a control unit (16). The decoder microchip also comprises four counter registers respectively numbered (17), (18), (19) and (20) in which decoder counter values may be stored and from where they may be compared with decoded counter values obtained by the control unit (16) from the decoded result register (15). Four outputs respectively numbered (21), (22), (23) and (24) are also provided and may be used by the control unit (16) to indicate what kind of information has been received.

The decoder microchip further comprises format scan means (26) for scanning and verifying the format of any transmissions received by the receiver (11).

In order to prevent a synchronization value which has been used for one synchronization command, from being used for subsequent synchronization commands, synchronization memory means (28) are provided.

Referring to FIG. 1, the identity number (6) of the encoder is programmed by the user with a secret value to provide the security of the system. Although there may be millions of other users of exactly the same encoder (FIG. 1) and decoder (FIG. 2) microchips, every user will have a very high degree of security. A decoder microchip will only be able to correctly decode a transmission value that has originated in an encoder microchip when the same identity number is programmed into it. Furthermore, a specific encoder will also be defined by the value of its status register (9). The format of the status register is shown in FIG. 5.

There can also be more than one input (1) into the control device, which will also influence the status register value (9).

The transmit counter (4) can be programmed with an initial value and will then change, e.g., increment or decrement, every time the encoder is used to transmit a value. In addition, the encoder may include a timing means or circuit, not shown, which times out a given period of time, e.g., from about 30 seconds to about 60 seconds, after a transmission, and after said time the transmit counter (4) value is changed, e.g. according to a preferred embodiment incremented by a number greater than one, e.g., 8 or 16, to provide further security against certain code grabbing devices. If, for example, the counter value of the encoder microchip is designed to change 30 seconds after a transmission or activation, and the encoder microchip is operated twice during a 30 second period, the counter value, according to a preferred embodiment, is only changed once.

Figure 6:
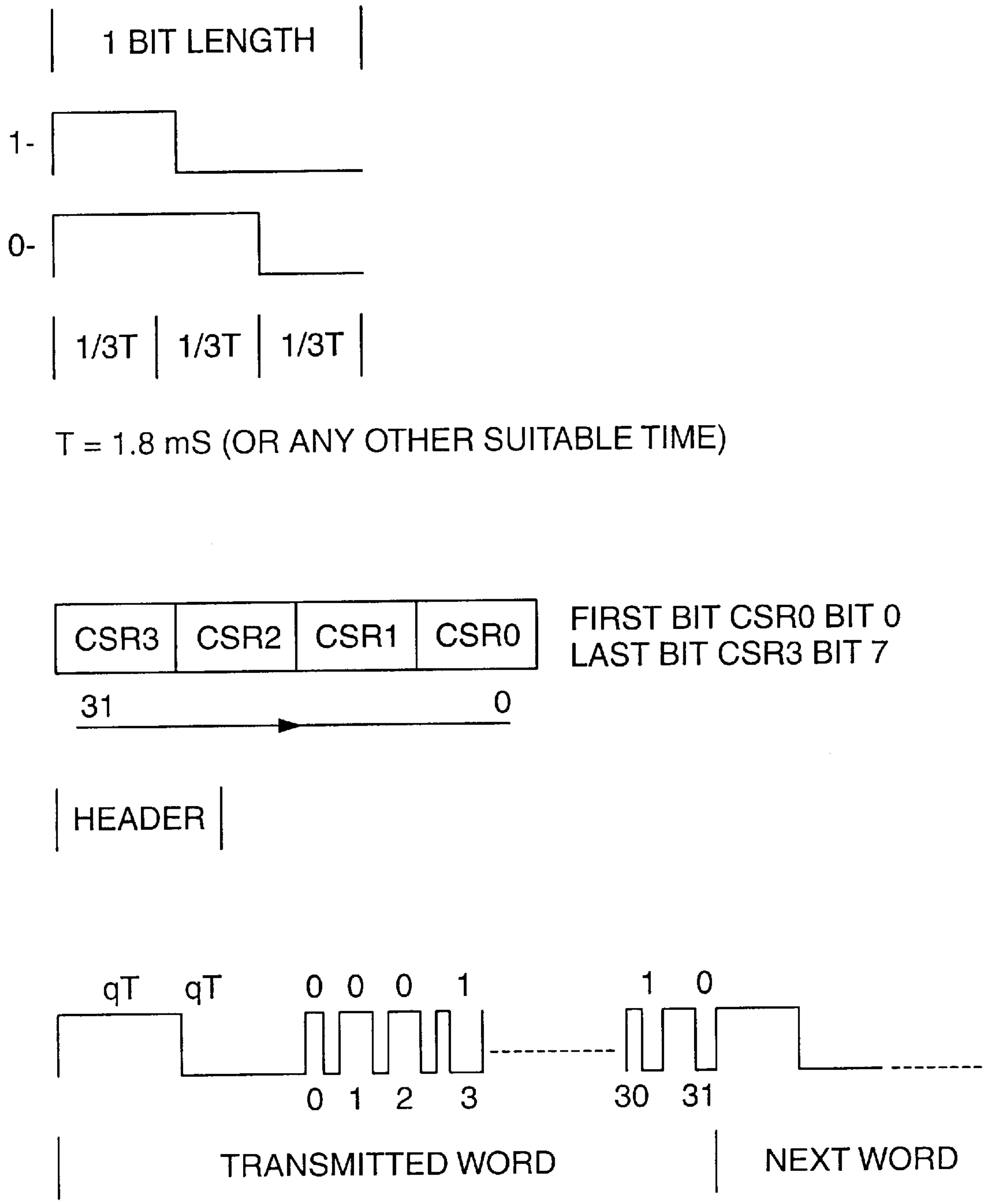
FIG. 6 is a preferred format for the transmission value.

The input word (5) to the encoding function comprises the unit number (CSR3 and CSR2 in the input register (5)) and the transmit counter value (CSR1 and CSR0 in the input register (5)). The non-linear encoding function (7) will use the identity number (6) to map the input word (5) to a transmission value that is stored in the transmission shift register (8). This value can be further encoded to form the transmission format as shown in FIG. 6.

The non-linear function may be any non-linear function of sufficient complexity and which has a related decoding function, i.e., if the non-linear decoder function is applied to the transmission value using the same identity number, it will produce as a result the value that was in the input word (5).

Figure 3:
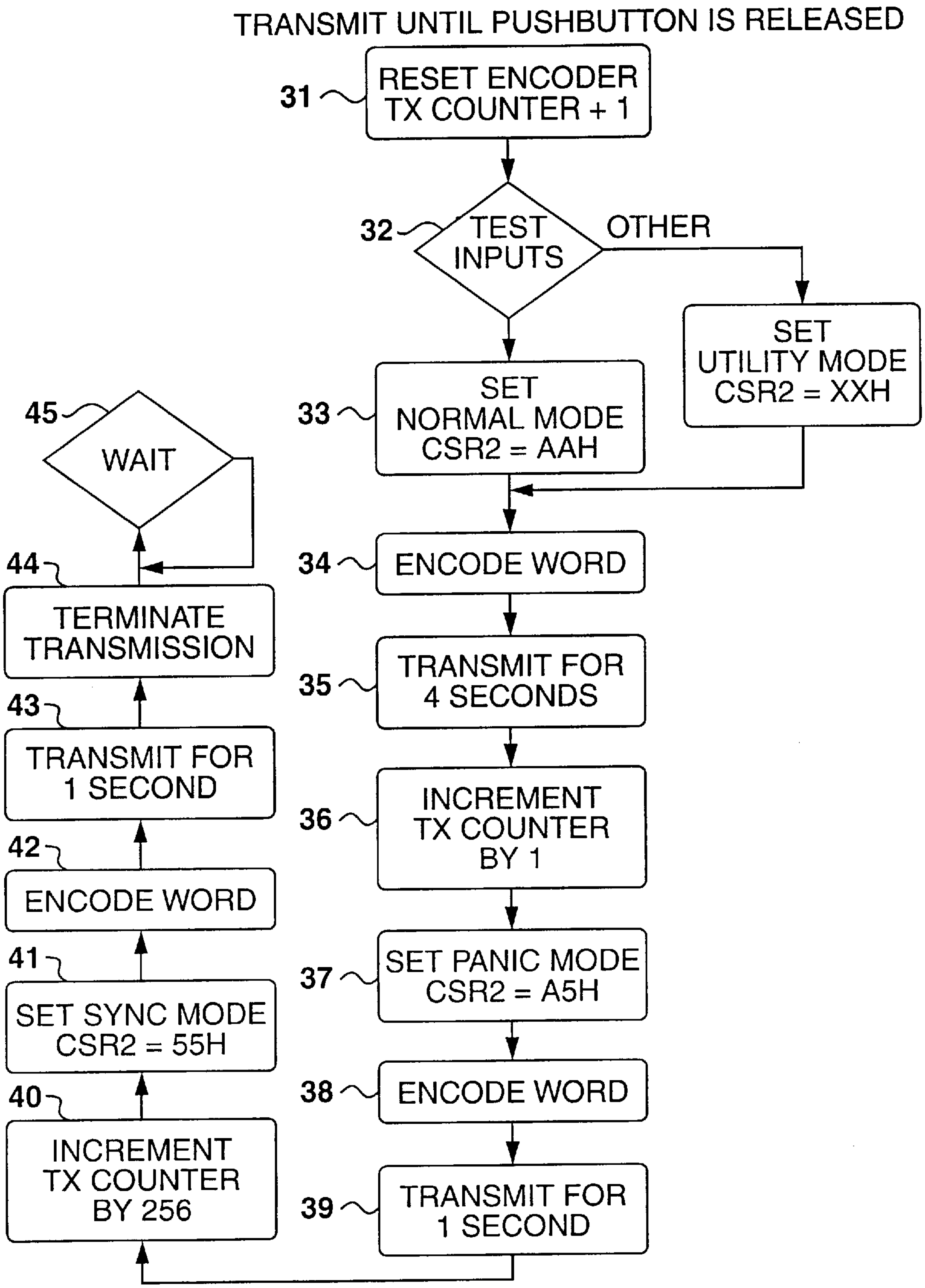
FIG. 3 is a flow diagram for the functions which the encoder microchip can perform.

The encoder operation is explained in the flow diagram of FIG. 3. When power is applied to the encoder microchip it would perform its functions in the sequence indicated. It would first reset itself to a defined state in order to start with normal operation (31). It is important to recognize that the operation of the encoder can at any time be terminated. If it is not terminated, it will sequentially execute the functions indicated in FIG. 3, until the wait loop (45) is reached. The encoder microchip will suspend its activities at this point and will perform no further functions until a reset function (31) is performed. The test shown in step (32) could be based on the inputs received from the switches (1) to the control unit (2).

A more detailed description of the encoder operation shown in FIG. 3 will now be provided. Upon activation the encoder will perform the following actions sequentially until terminated. The first action (31) will be to reset itself. Then the encoder will increment the transmitter counter value, an action that is repeated every time the encoder is activated to transmit a value.

Next the inputs will be tested (32) to determine whether a normal or other (utility) command is required. The inputs will also influence the status register. Based on the inputs the appropriate command value would be loaded into the CSR2 register part of the unit number. If in (32) a normal mode is determined CSR2 is set to AAH, otherwise CSR2 is set to XXH. The encoding operation (34) will now take place to create the transmission value from the input word (5). The transmission value will be transmitted for four seconds (35). If the encoder is still activated after this time it will proceed to increment the transmitter counter value again (36) and to load the CSR2 register with a different value, A5H, for example the "panic" command value (37) before encoding the input word again (38). The resulting transmission value will again be transmitted for a period of time (1 second) (39).

If the transmission has still not been terminated, the encoder operation will proceed to perform a synchronization sequence. This may include incrementing the transmitter counter value by 256 (40) and setting the CSR2 value to 55H to indicate a synchronization command (41). It will then again encode the input word before transmitting it (42, 43). After one second (43) the encoder will terminate all further transmissions and will perform an endless wait loop until it is deactivated (45). It should be noted that the transmit sequence may be terminated at any time.

The synchronization sequence may perform some other tests on the counter to further establish it as a synchronization counter value for example the lower 8 bits of the counter value must be forced to zero.

The transmission word (8) must be at least as long as the input word (5), but need not be the same length as the identity number (6). Security requirements dictate that the transmit counter (4) should be at least 16 bits long and so too the unit number. This indicates that a good length for the transmission word is 32 bits. This provides ample security and is also practical in terms of transmission time and implementation costs.

Figure 4A:
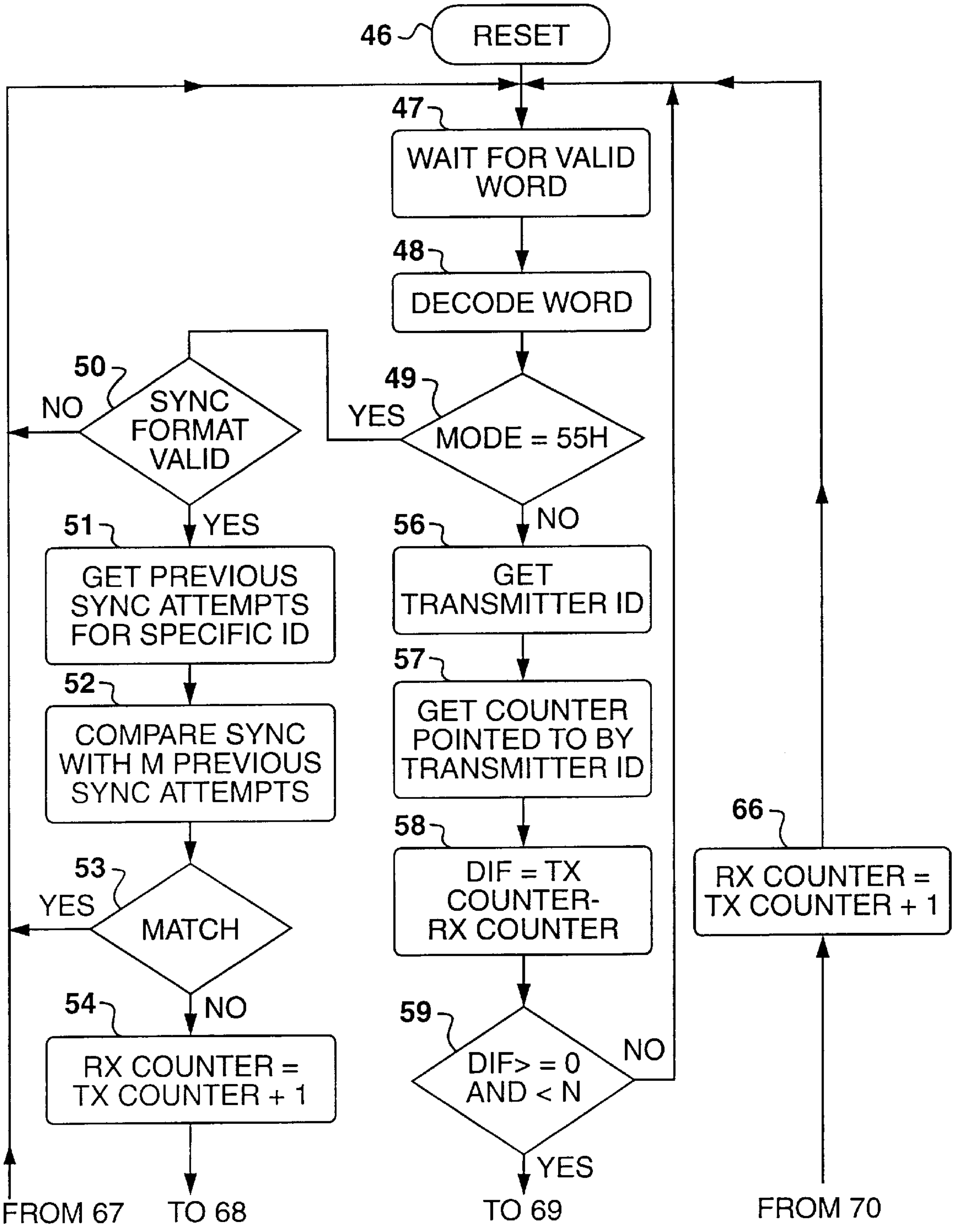
FIGS. 4*a* and 4*b* are a flow diagram for the functions which the decoder microchip can perform.
Figure 4B:
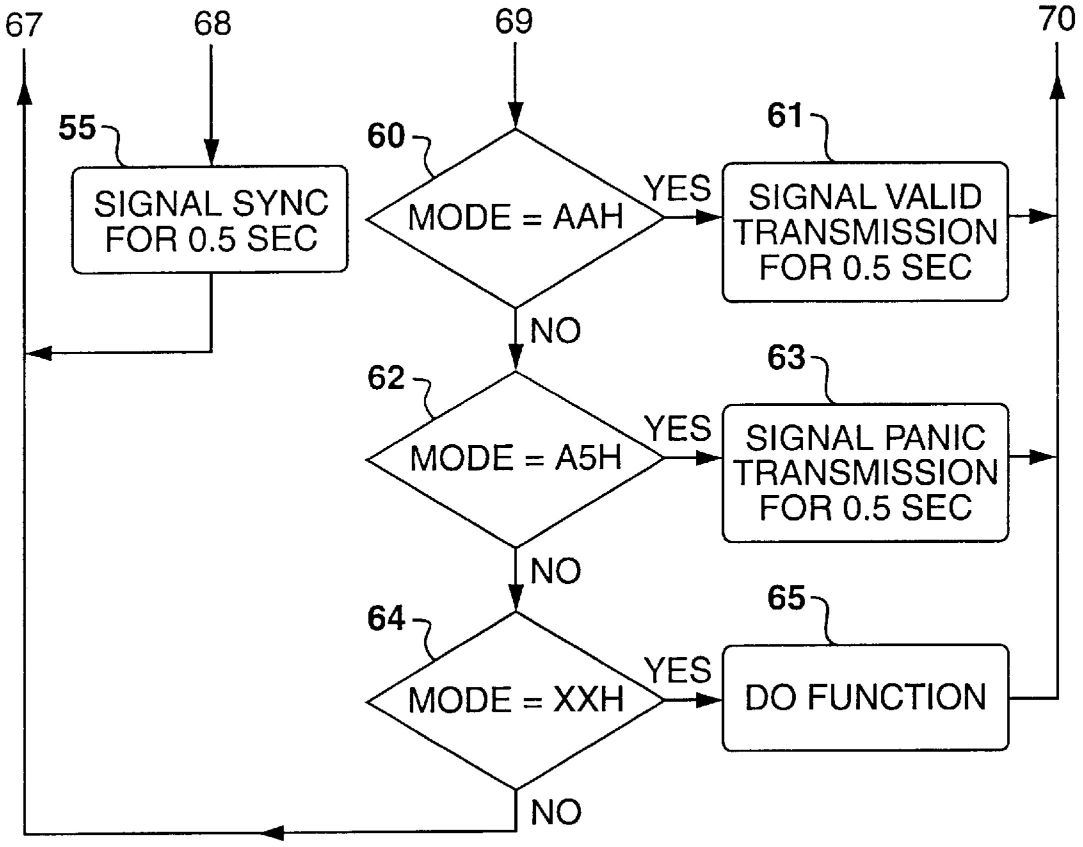

The functions and operation of the decoder microchip are substantially more complex and would be described with the help of simple examples. The block diagram in FIG. 2 shows the functional elements of the decoder microchip and the flow diagram in FIGS. 4 and 4*a* shows it operation.

It should be clear from the encoder description that all information bits to be transmitted are encoded with the non-linear encoding function. This has the effect that the transmission value (8) bears no obvious resemblance to the input word (5). However, at the decoder the information embedded in the input word must be recovered.

The receiver (11) turns the transmitted signals, whether they are in the form of radio frequency, infra red waves or any other suitable medium, into a digital signal. This digital signal in the receiver (11) is continuously scanned (26, 47) from a word that conforms to the format such as shown in FIG. 6. Another format may be chosen if it has advantages. When a valid transmission word is recognized, it is moved into the decoder input shift register (12). The control (16) of the decoder microchip would then apply the decoding function (13) with inputs from the preprogrammed decoder identity number (14), to the value in the input shift register (12). The result of this decoding operation (48) is stored in the decoded unit number and decoded counter value result register (15).

The next operation (49) is to compare the value in the CSR2 (see FIG. 5) which is part of the unit number which is in turn part of the decoded result with the code for a synchronization command. If they compare, the decoder will proceed with operation (50) along the path on the flow diagram that shows the uni-directional synchronization operation.

If they do not compare, it will proceed to get (56) the transmitter identity from the decoded result register (15). The control (16) will then calculate the difference (58) between the decoded counter value and the corresponding Rx counter value (17, 18, 19, 20). If the difference is greater than or equal to zero but less than a value n, the decoded value is accepted as the result of an authorized or valid transmission. The value n is the number of lost codes which the system may be set up to handle.

In practice, this means that a remote control system comprising a transmitter and a receiver, i.e., an encoder and decoder set with identical identity numbers (6, 14), does not have to remain in perfect synchronization.

For example, if n is say 100, then the transmitter, once it has been synchronized can be activated, for instance, 98 times out of range of the receiver (dummy transmissions) and if on the 99th time it is activated, the transmission is within range of the receiver, the decoder performs one decoding operation and will then accept the transmission as valid. If however, more than 100 (for n=100) dummy transmissions have taken place, the receiver will ignore all further transmissions from that transmitter until it receives a transmission value that decodes into a valid synchronization command.

If the decoded result was accepted as valid (59), the control can then determine what command was transmitted (60, 62, 64) and can then take the desired action (61, 63, 65), before returning to a state where it scans (47) for a valid word. The decoded counter value of a valid transmission will be changed and stored (66) in the corresponding Rx counter register (17, 18, 19, 20). In a preferred embodiment, the decoded counter value of a valid transmission is incremented by a number greater than one, e.g., 8 or 16, and stored (66) in the corresponding Rx counter register (17, 18, 19, 20). Of course, the receiver should be set to change or increment its stored counter value by the same value as the transmitter. The decoded counter value should only be incremented after a certain given period of time subsequent to the receipt of a valid transmission. This embodiment provides additional security against newly developed code grabbing devices as described above. This means that once a transmission has been received as valid, the counter value of that transmission and all previous counter values will become unacceptable to that decoder microchip.

The uni-directional synchronization process is essential for establishing synchronization between a matched transmitter and receiver. If in operation (49) the transmission is recognized as possibly a synchronization command, the control will proceed to perform further tests to verify (50) that the format of the counter conforms to the requirements for a synchronization command. For example, the lower 8 bits of the decoded counter value must be zero. If the format does not conform to specifications for a synchronization command, the control takes the decoder microchip back to operation (47) and the decoded value is ignored.

If the decoded value passes test (50) the decoder will proceed to test the synchronization counter value against a previous valid synchronization operation (51, 52) and if it recognizes a repeat, the decoder will ignore this decoded word and will return to (47). However, if the command passes to (54) the decoder counter value will immediately be modified to the decoded value plus one. This value may be any possible value within the constraints of counter length and of course the format requirements of the synchronization command. The decoder will give an indication (55) that it has accepted the new counter value. In an automotive application, this might be used to turn the flicker lights on and off as an indication to the user that synchronization has been achieved.

In terms of security, it should be noted that although the decoder counter has been synchronized, the decoder will still need to receive a valid transmission based on the new counter value before it will indicate a valid reception (61, 63, 65). The synchronization command and for that matter any other command cannot be determined from an investigation of the transmission value, because of the non-linear effect of the encoding function and the fact that it forms part of the input word which gets encoded.

It is very important to achieve the highest possible security in the synchronization process because it is always a weak point in a uni-directional system. Because the window n can be large and EEPROM can be used to store counter values, synchronization will only rarely be required. Other users will have no effect on the operation of a matched encoder/decoder set. This set will automatically keep in step without any actions by the user.

Synchronization is a very simple and straightforward process with very limited impact on the user, since it takes only a few seconds and does not require any additional signals or actions. Because of the fact that synchronization values cannot be repeated in a non-volatile memory application, a high degree of security is offered by the system.

According to one embodiment, the encoder microchips and decoder microchips have timing or time out means or circuits that time out a period, e.g., 30 to 60 seconds, and then the microchips are switched off. According to one embodiment, before the microchips are switched off, the counter value is changed, e.g. in a preferred embodiment incremented by a number greater than one, after a period of time, subsequent to a transmission or receipt of a signal, e.g., it may, according to one embodiment, increment the counter value by 8 or 16 after some period of time before the microchip is switched off. For example, the system comprising the encoder and decoder microchips described above according to one embodiment, work as follows. The timing circuits or means are programmed to change, in this example increment, the counter value of the microchips by 16 and the current counter value is 100. A single press of the activation button on the transmitter would cause the counter to increment to 101 before the transmission occurs. Assuming two presses of the activation button are required to activate the system, and they take place within 15 seconds of each other, then the counter would have a value of 102 in the current system and would transmit 103 the next time it is activated. According to this embodiment, the microchip would not completely switch off but would time out, e.g., approximately 30 seconds, and would then add 16 to the counter resulting in a counter value of 118 before the microchip was switched off without, of course, transmitting the new value. Consequently, the next transmission this system would make upon the next activation would be based on a counter value of 119. According to a preferred embodiment, if the transmitter, i.e., encoder microchip, is activated twice during a given period of time, e.g., 15 seconds, and the microchip is set to change, e.g., according to a preferred embodiment increment, the counter value after a longer given period of time, e.g. 30 seconds, subsequent to activation, the counter value is only changed once, not twice.

According to the above-described embodiment of the invention, the decoder counter would also get incremented by the same value, e.g., 16 after a valid code word reception. The decoder counter value is preferably incremented after the encoder counter value, e.g., 5 to 10 seconds later. According to this embodiment, the decoder window for single code acceptance is preferably about 2 or more times the size of the increment number to make sure the requirement for double transmission resynchronization is not too often. This embodiment is specifically useful for providing an easy, inexpensive system which is not vulnerable to the new code grabbing devices which jam and record first and second transmission signals, transmit the first signal, while retaining the second signal for future unauthorized access after the authorized user has left.

I claim:

1. A system which includes an encoder microchip and a decoder microchip, wherein:

said encoder microchip comprises:

means for storing an identification number, means for storing a counter value, means for changing the value of said counter value each time the encoder microchip is operated, encoding means for performing a nonlinear encoding function on said counter value using said identification number, so as to generate a transmission value, second means for changing the changed counter value after a given period of time subsequent to the encoder microchip being operated, with the proviso that if the encoder microchip is operated more than once during said given period of time, the counter value is only changed once by the second means for changing; and said decoder microchip comprises:

means for storing a second identification number, means for receiving said transmission value from said encoder microchip;

means for performing a decoding function on said transmission value using said second identification number, so as to generate from said transmission value a decoded counter value, means for storing a second decoded counter value obtained from the decoding of a transmission value of a previous transmission by said means for performing a decoding function;

means for changing the stored second decoded counter value after a period of time subsequent to each time the decoder microchip receives a transmission value; and means for performing a format scan on signals so as to identify signals conforming to a specific format.

2. An encoder microchip comprising:

means for storing an identification number;

means for storing a counter value;

means for changing the value of said counter value only when the encoder microchip is operated;

encoding means for performing an encoding function on at least said counter value using said identification number, so as to generate a transmission value; and means for changing the changed counter value after a period of time subsequent to the encoder microchip being operated.

3. A transmitter remote control device, comprising:

an encoder microchip as claimed in claim 2;

means for modulating the transmission value; and means for transmitting the modulated transmission value to a matched receiver remote control device.

4. A decoder microchip comprising:

first means for storing an identification number;

second means for storing at least a first counter value;

output means;

input means for data;

means for performing a decoding function on the received data using said identification number so as to generate a second counter value;

third means for comparing the second counter value with the first counter value;

activating means for activating the output means, if a comparison carried out by said third means shows that the second counter value is within a defined range of the first counter value;

storage means for storing information relating to said second counter value in the second means if said output is activated; and means for changing said stored second counter value after a period of time subsequent to storage of said second counter value.

5. A system as recited in claim 4 wherein said means for activating activates said output means when said second counter value is within only a forward range of said first counter value.

6. A decoder microchip according to claim 4, wherein the second storage means stores a plurality of counter values, each being related to a different encoder microchip.

7. A decoder microchip as claimed in claim 4, comprising:

activating means for activating, if a comparison carried out by said third means shows that the second counter value is within a defined range of the first counter value, the output means.

8. A remote control system which comprises a transmitter and a receiver, the transmitter comprising:

first means for storing a first identification number;

second means for storing a counter value which is related to a number of times the transmitter is activated;

means for performing an encoding function on the first identification number and on the counter value so as to generate a transmission value;

means for transmitting the transmission value to the receiver and indicating an activation of the transmitter to a user;

means for changing the stored counter value after a period of time subsequent to transmitter activation;

the receiver comprising:

third means for storing a second identification number which is the same as the first identification number;

means for receiving said transmission value; and means for performing a decoding function, using the second identification number, on the received transmission value, so as to generate a decoded counter value.

9. A remote control system which comprises a transmitter and a receiver, the transmitter comprising:

first means for storing a first identification number;

second means for storing an encoder counter value;

means for performing an encoding function on at least the first identification number and the encoder counter value so as to generate a transmission value, the encoder counter value being dependent on a number of times the encoding function is performed;

means for transmitting the transmission value to the receiver and indicating an activation of the transmitter to a user;

means for changing the stored encoder counter value after a period of time subsequent to transmission; and the receiver including:

third means for storing a second identification number which is the same as the first identification number;

means for receiving said transmission value;

means for performing a decoding function, using the second identification number, on the received transmission value, so as to generate at least a decoded counter value that is the same as the encoder counter value;

fourth means for storing the decoded counter value;

means for comparing the decoded counter value to the decoder counter value which is stored in the fourth means and which was generated from a preceding received transmission value;

means for determining whether the decoded counter value falls within a particular range with regard to the decoded counter value;

means for causing a value related to the decoded counter value to be stored in the fourth means if the comparison shows that the decoder counter value is within a said particular range; and means for changing the value related to the decoded counter value to be stored in the fourth means after a period of time subsequent to the storage of the decoded counter value in said fourth means.

10. A system as recited in claim 9, wherein said means for determining determines whether said decoded counter value if said decoded counter value is within only a forward range of said decoded counter value stored in said fourth means.

11. An encoder microchip, comprising:

means for storing an identification number, means for storing a counter value, means for forming a unit number selected from the group consisting of information representing a command, information representing an input value, information representing a transmitter number and a constant value, means for changing the value of said counter value each time the encoder microchip is operated, encoding means for performing an encoding function on said counter value and on said unit number using said identification number, so as to generate a transmission value; and second means for changing the changing counter value after a period of time subsequent to the generation of a transmission signal, wherein said unit number is modified in relation to a length of time that the encoder is operated.

12. A decoder microchip comprising:

a memory having a stored counter value from a previous transmission;

an input data port;

a decoder, connected to said memory and said input data port, for performing a decoding function on data received by said input data port using an identification number stored in said memory and for generating a decoded counter value;

a comparator connected to said decoder and said memory;

an output circuit;

an output activation circuit, connected to said comparator and said output circuit, for activating said output circuit, for comparing said decoded counter value to the stored counter value, and for storing said decoded counter value in said memory, if said decoded counter value is within a defined range of said stored counter value;

a timing circuit connected to said memory for timing out a given period of time for the stored decoded counter value to be changed; and wherein said output activation circuit activates said output circuit when said decoded counter value is within only a forward range of said stored counter value.

* * * * *